Figure 7:
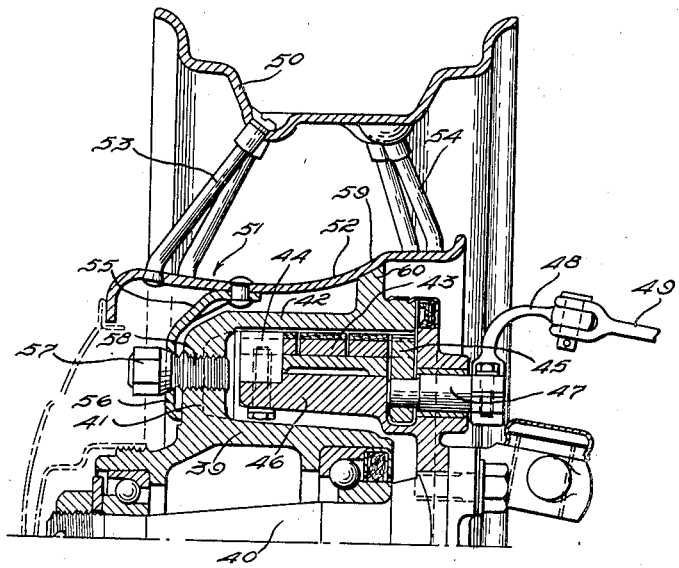

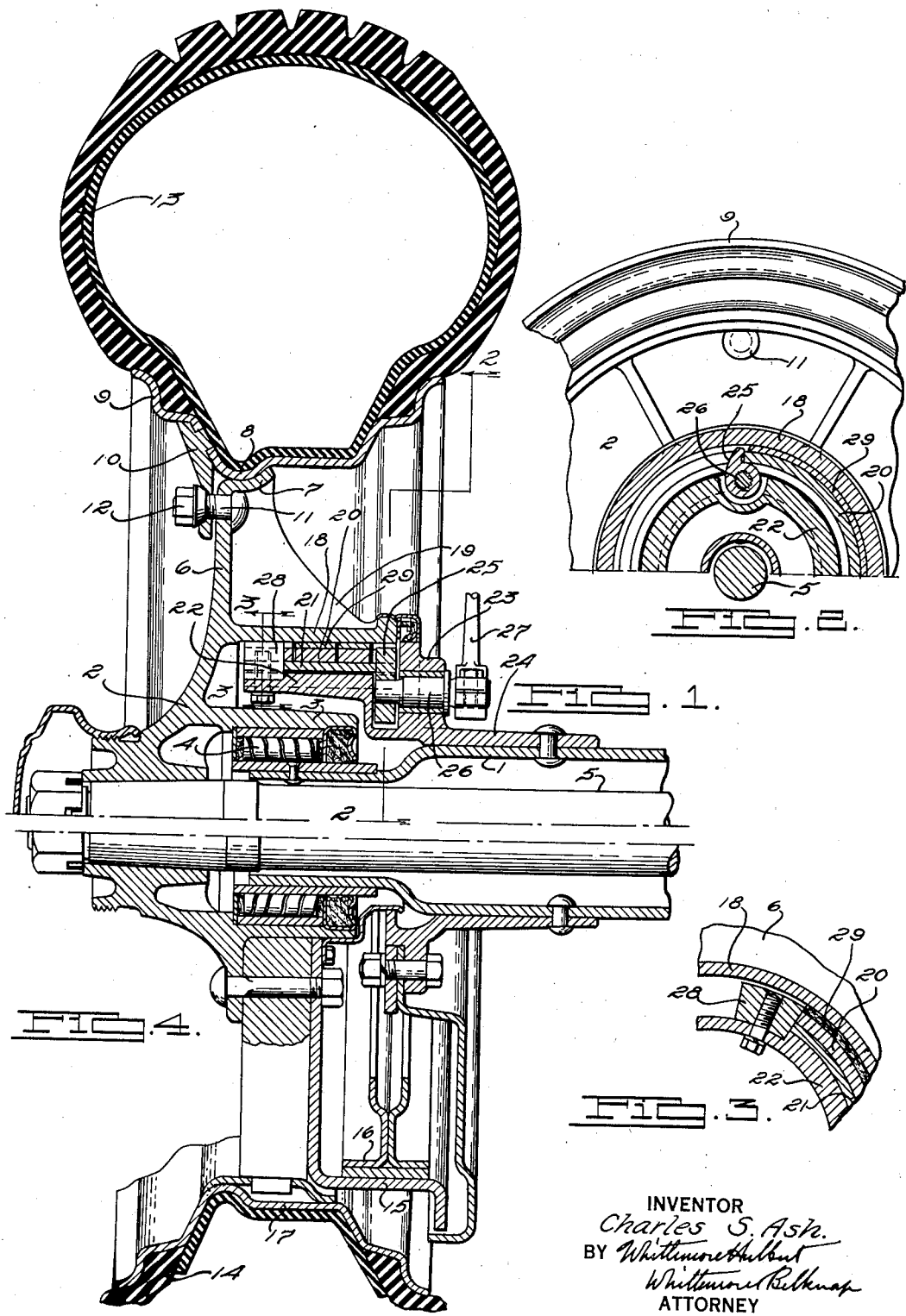

Oct. 29, 1935.                 C. S. ASH                    2,019,109
                       WHEEL AND BRAKE ASSEMBLY
                       Filed March 16, 1931        3 Sheets-Sheet 2
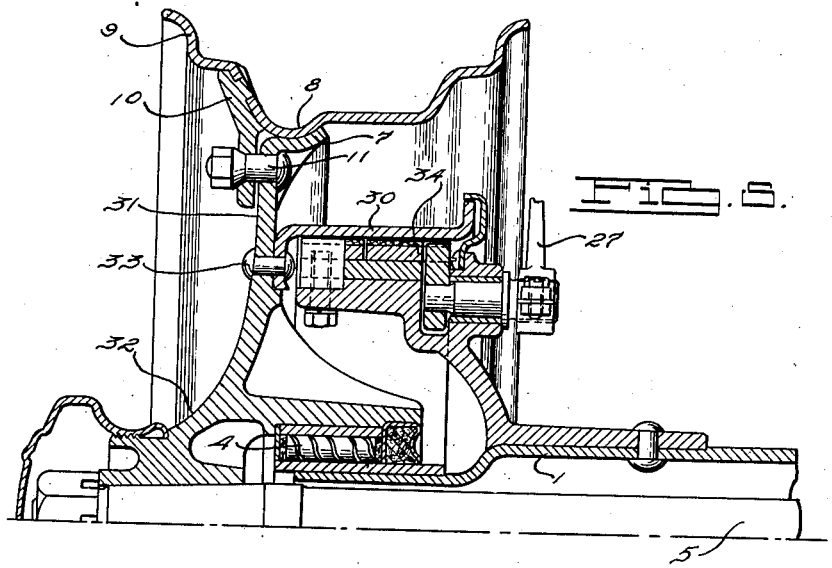
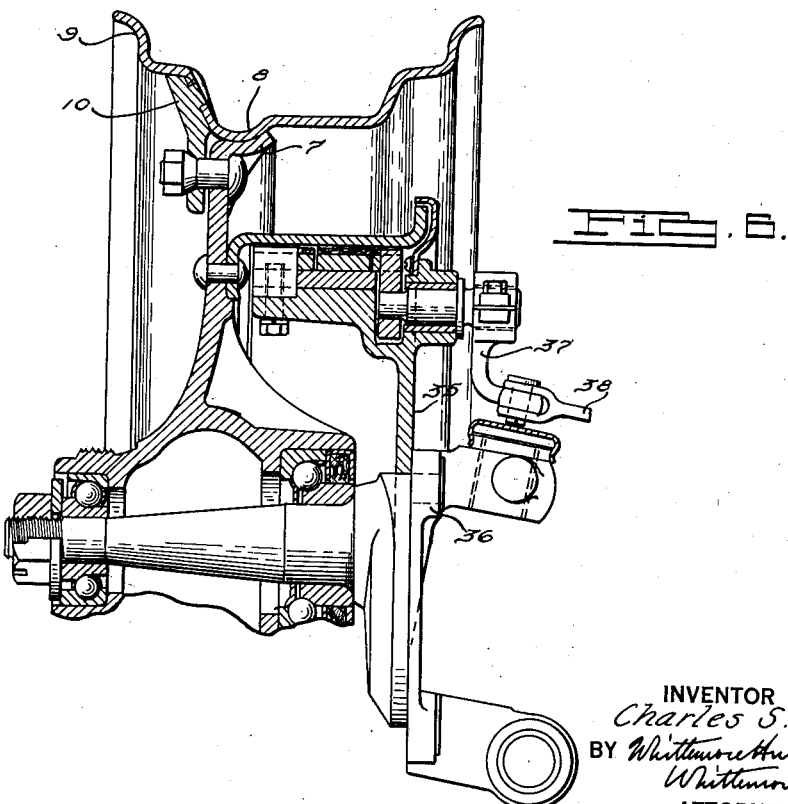
INVENTOR
Charles S. Ash.
BY
ATTORNEY Oct. 29, 1935.   C. S. ASH   2,019,109
WHEEL AND BRAKE ASSEMBLY
Filed March 16, 1931   3 Sheets-Sheet 3

INVENTOR
Charles S. Ash.
BY
ATTORNEY

Patented Oct. 29, 1935

2,019,109

UNITED STATES PATENT OFFICE 2,019,109

WHEEL AND BRAKE ASSEMBLY

Charles S. Ash, Birmingham, Mich., assignor, by mesne assignments, to The Kelsey-Hayes Wheel Company, Detroit, Mich., a corporation of Delaware Application March 16, 1931, Serial No. 523,118

6 Claims. (Cl. 301—6)

The invention relates to wheel and brake assemblies and refers more particularly to wheel and brake assemblies for automobiles. One of the objects of the invention is to so construct the wheel and brake assembly that a low pressure tire of greater cross sectional area than that of a standard tire for the same load may be used on a motor vehicle. Another object is to so construct the wheel and brake assembly that the low pressure tire has substantially the same external diameter as that of the standard tire and the tire carrying rim of this wheel and brake assembly and the tire carrying rim is of sufficiently less diameter than the standard rim for the standard tire to receive the low pressure tire and also the brake is located within the confines of the rim and is at least as effective as the standard brake of the standard wheel and brake assembly heretofore used with the standard tire. These and other objects of the invention will be apparent from the following description, taken in connection with the accompanying drawings, in which Figure 1 is a section taken through a wheel and brake assembly, showing an embodiment of my invention;

Figures 2 and 3 are cross sections on the lines 2—2 and 3—3 respectively, of Figure 1;

Figure 4 is a view similar to Figure 1, showing the standard wheel and brake assembly heretofore used with a standard tire for the same load as that for which the wheel and brake assembly and tire of Figure 1 is designed to carry;

Figures 5, 6, 7, and 8 are views similar to Figure 1, showing other embodiments of my invention.

As illustrated in Figures 1, 2, and 3, the wheel and brake assembly embodying the invention is mounted upon the rear axle and more particularly its housing 1. 2 is the hub of the assembly having the tubular flange 3 which is supported upon the end of the housing by the anti-friction bearing 4. This hub beyond the housing is non-rotatably secured in any usual manner to the drive shaft 5 of the rear axle. 6 is the wheel body of the assembly having at its outer periphery the transverse rearwardly extending flange 7. This flange is preferably arcuate to receive the correspondingly shaped depression or bead 8 in the base of the tire carrying rim 9. This tire carrying rim is of the drop-center type and it is demountably secured to the wheel body in the present instance by suitable means, such as the lugs 10, which are permanently secured to the front side wall of the drop-center portion and the bolts 11 which are secured to and extend transversely through the wheel body adjacent to but inwardly beyond the flange 7 and also the nuts 12 threaded upon these bolts and abutting the lugs.

The tire 13 carried by the rim 9 is of greater cross sectional area than that of the standard tire 14, as illustrated in Figure 4. The tire 13, however, has substantially the same external diameter as that of the standard tire 14, so that its width is appreciably greater and its internal diameter is appreciably less. This low pressure tire is designed to carry the same load as the standard tire 14 and its proper inflation pressure is appreciably lower than that of the tire 14, so that it has much better riding properties.

In the standard wheel and brake assembly, as illustrated in Figure 4, the brake flange 15 of the brake drum is of relatively large diameter in order to provide the desired area of brake surface for engagement by the brake 16. Furthermore, this brake flange is laterally offset from the median plane of the rim 17 carrying the tire 14.

To secure safety in operation of the present wheel and brake assembly with the low pressure tire, the brake flange is located within the confines of the rim 9 and it and its cooperating brake are so designed that while the diameter is less, the effectiveness of the braking action is at least equal to that of the brake 16 and brake flange 15. In this connection, it is also to be noted that the diameter of the brake flange 15 of the standard brake drum is so great that this brake drum cannot be used in the present wheel and brake assembly, since the brake flange would extend radially beyond the base of the drop-center portion of the rim 9.

18 is the brake flange of the wheel and brake assembly, it being located within the confines of the rim 9 and between the flange 3 and the rim 9. The brake flange, the wheel body and the hub are all preferably integral with the brake flange, the wheel body and its rim seating portion being preferably reinforced by the radially extending ribs or webs 19 integral therewith. 20 is the brake within and engageable with the brake flange 18. This brake is a spiral braking element of progressively increasing width from its front to its rear ends and so arranged that during rotation of the wheel and upon application of the brake and the expanding pressure applied to its front end the brake flange exerts a wrapping effort. This spiral braking element encircles the cylindrical sleeve 21, which is supported upon the cylindrical flange 22 of the brake support 23, the latter having the portion 24 sleeved upon and fixedly secured to the rear axle housing 1. Engageable with the front end of the spiral braking element is the lever 25 which is fixedly secured to the shaft 26 journalled in the support 23 and adapted to be actuated by suitable means, such as the lever 27. 28 is an abutment fixedly secured to the cylindrical flange 22 of the support and engageable with the rear end of the spiral braking element to limit its rotation upon application of energizing pressure through the lever 25. This spiral braking element is preferably provided with a suitable brake lining 29.

The width of the effective brake surface of this brake flange 18 is preferably greater than that of the brake flange 15 of the standard brake drum. Furthermore, the operation of the spiral braking element is such that with this increased width the effectiveness of the brake is equal at least to that of the brake of the standard construction shown in Figure 4, although the wheel and brake assembly is so designed that the brake is within the confines of the rim.

In the modification shown in Figure 5, the wheel and brake assembly is designed for the same load as that to be carried by the modification illustrated in Figures 1 to 3, inclusive, or the standard wheel and brake assembly illustrated in Figure 4. However, in this modification the parts have the same general arrangement as those in Figures 1 to 3, inclusive, with the exception that the brake flange 30 is formed separately from the wheel body 31 and the wheel hub 32 and is permanently secured to this wheel body as by means of the rivets 33. The diameter and the width of the brake surface of this brake flange are respectively greater and less than the diameter and width of the brake surface of the brake flange 18, but are so proportioned that the effective area of this brake surface is the same as the effective area of the brake surface of the brake flange 18. The brake 34 for cooperating with the brake flange 30 is of the same construction as the brake 20, but its dimensions vary in the same manner as those of the brake flange 30.

Figure 6 illustrates another modification in which a front wheel and brake assembly is shown for the same load. In this modification, the brake support 35 is mounted upon and fixedly secured to the steering knuckle 36 and the lever 37 for actuating the brake is pivotally connected to the link 38 in substantial alignment with the pivot for the steering knuckle. The construction of the wheel and brake assembly, aside from these differences and also aside from the necessary difference in the hub, is substantially the same as that of Figure 5.

Figure 7 illustrates another front wheel and brake assembly in which 39 is the hub journalled upon the spindle 40 and having the fixed radial flange 41 intermediate the anti-friction bearings for supporting the hub upon the spindle. 42 is the brake flange preferably integral with the radial flange 41 and extending rearwardly from its edge. This brake flange encircles the hub and the brake 43, which is in the nature of a spiral braking element engageable at its rear end with the abutment 44 and at its front end with the lever 45. The abutment is fixed to the annular support 46 which is mounted upon and secured to the steering knuckle. The lever is fixed upon the shaft 47, which is journalled in the support and has secured thereto the lever 48, which is pivotally connected to the link 49 in substantially the axis of the pivot for the steering knuckle.

The rim member 50 is of the same size as the rim member 9, but this rim member 50 forms part of a wire wheel having the hub shell 51. This hub shell comprises the tubular section 52 which is connected to the rim member by the front and rear spokes 53 and 54, respectively. This hub shell also comprises the anchoring member 55, which is secured to the tubular section intermediate its ends and also intermediate the points of connections of the front and rear spokes therewith and which has the inwardly extending radial portion 56. This radial portion is adapted to extend adjacent to the fixed flange 41 of the hub and to be engaged by the nuts 57 upon the bolts 58, which latter are fixedly secured to and extend transversely of the fixed flange. The tubular section 52 has at its rear end the flaring portion 59 which is adapted to seat upon a correspondingly shaped portion of the radial flange 60 formed at the rear end of the brake flange 42.

Figure 8:
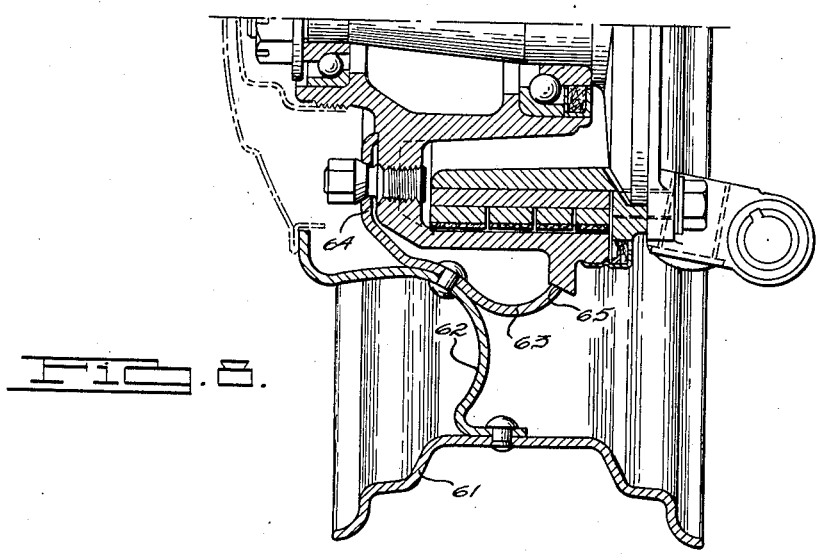

In the wheel and brake assembly illustrated in Figure 8, a disk wheel is demountably secured upon the hub instead of the wire wheel illustrated in Figure 7. Aside from this construction of disk wheel, the parts have the same general arrangement. In detail, the disk wheel has the rim member 61, which is the same as the rim member 50, the disk 62, which at its periphery is permanently secured to the rim member 61, and the hub member 63, which is permanently secured to the disk intermediate its edges. This hub member is provided with the radial portion 64 corresponding to the radial portion 56 of the wire wheel and is also provided with the rear bevelled edge 65 for engaging the bevelled seat formed upon the radial flange at the rear end of the brake flange.

What I claim as my invention is:

1. A wheel and brake assembly, comprising a hub, a brake flange encircling and mounted on said hub, a demountable disk wheel having a rim member encircling said brake flange, a disk secured to the rim member, and a hub member secured intermediate the ends thereof to said disk, one end portion of said hub member fashioned to rest upon said brake flange at one end thereof and the other end portion of said hub member detachably secured to the first mentioned hub at the opposite end of the brake flange.

2. A wheel and brake assembly, comprising a hub, a brake flange encircling and mounted on said hub, a demountable disk wheel having a rim member encircling said brake flange, a disk secured to the rim member and having an axially extending portion provided with an inwardly extending flange spaced forwardly beyond the front end of the brake flange for receiving a hub cap, and means connecting the disk intermediate the ends thereof to the hub including a member resting upon the brake flange at one end thereof and detachably secured to said hub at the opposite end of the brake flange.

3. A wheel and brake assembly, comprising a hub, a brake flange encircling and mounted on said hub, a demountable disk wheel having a rim member encircling the brake flange and having a hub member connected to the rim member, said hub member having a portion at the rear end thereof fashioned to seat upon the corresponding end of the brake flange and having a portion at the front end thereof extending forwardly beyond the brake flange provided with an inwardly extending flange fashioned to detachably receive a hub cap, and means concealed by the hub cap for securing the hub member to the hub aforesaid at the front side of the brake flange including a portion extending inwardly from the hub member intermediate the ends thereof to a position adjacent the front side of the brake flange.

4. A wheel and brake assembly, comprising a hub, a brake flange encircling and mounted on said hub, a demountable disk wheel having a rim member encircling the brake flange and having a hub member connected to the rim member, said hub member having a portion adjacent the rear end thereof fashioned to seat upon the brake flange at the rear end of the same and having a portion at the front end extending forwardly beyond the corresponding end of the brake flange, and attaching portions extending inwardly from the hub member intermediate the ends thereof to a position adjacent the hub aforesaid in advance of the brake flange thereon.

5. A wheel assembly comprising an inner hub having a radially disposed surface adjacent the forward end thereof, a rim member encircling the inner hub, an outer hub member also encircling the inner hub, said outer hub member having a portion at the rear end seated upon the inner hub member and having a portion at the forward end extending to the front side of the radially disposed surface aforesaid of the inner hub, means connecting the rim member to the hub including a wheel body member having a portion secured to the outer hub member intermediate the ends of the latter and having another portion extending forwardly beyond the inwardly extending portion of the outer hub member and fashioned to detachably receive a hub cap, and means concealed by the cap for securing the inwardly extending portion of the outer hub member to the inner hub member.

6. A wheel assembly comprising an inner hub having a radially disposed surface adjacent the forward end thereof and having a seat adjacent the rear end thereof, a rim member encircling the hub, an outer hub member also encircling the inner hub, said outer hub member having a portion fashioned to rest upon the seat on the inner hub member and having another portion extending inwardly to a position opposite the front side of the radially disposed portion of the inner hub, means connecting the rim member to the outer hub including a wheel body member having a portion secured to the outer hub member intermediate the ends of the latter and having another portion extending forwardly beyond the inwardly extending portion of the outer hub, and means for securing said inwardly extending portion of the outer hub to the inner hub.

CHARLES S. ASH.